US008087712B2

(12) United States Patent
Svengalis

(10) Patent No.: US 8,087,712 B2
(45) Date of Patent: Jan. 3, 2012

(54) WINDSHIELD DEICER

(76) Inventor: David Svengalis, Los Angeles, CA (US)

(*) Notice: Subject to any disclaimer, the term of this patent is extended or adjusted under 35 U.S.C. 154(b) by 200 days.

(21) Appl. No.: 12/399,138

(22) Filed: Mar. 6, 2009

(65) Prior Publication Data

US 2010/0224040 A1 Sep. 9, 2010

(51) Int. Cl.
*B60J 11/08* (2006.01)
*B60S 1/02* (2006.01)

(52) U.S. Cl. .................. 296/96.15; 15/236.02; 150/168; 160/370.21; 296/95.1

(58) Field of Classification Search ............... 15/236.01, 15/236.02; 150/168; 160/370.21; 296/95.1, 296/96.15
See application file for complete search history.

(56) References Cited

U.S. PATENT DOCUMENTS

| | | | | | |
|---|---|---|---|---|---|
| 1,346,664 | A | * | 7/1920 | McMahon et al. | 160/329 |
| 2,223,145 | A | | 11/1940 | Wise | |
| 2,646,118 | A | | 7/1953 | Berty | |
| 3,042,111 | A | * | 7/1962 | Wytovich | 150/168 |
| 3,411,562 | A | * | 11/1968 | Garrett | 160/327 |
| 3,964,780 | A | * | 6/1976 | Naidu | 150/168 |
| 4,635,993 | A | | 1/1987 | Hooper et al. | |
| 4,779,918 | A | * | 10/1988 | McNamee | 296/95.1 |
| 4,805,323 | A | | 2/1989 | Motohashi | |
| 4,848,225 | A | | 7/1989 | Arai et al. | |
| 4,850,635 | A | | 7/1989 | Lindell | |
| 4,964,667 | A | * | 10/1990 | Reis et al. | 296/95.1 |
| 5,035,460 | A | | 7/1991 | Huang | |
| 5,037,156 | A | | 8/1991 | Lundberg | |
| 5,123,468 | A | | 6/1992 | Mater, Jr. | |
| D337,749 | S | | 7/1993 | Craighead et al. | |
| 5,356,191 | A | | 10/1994 | Sheehan | |
| 5,412,177 | A | * | 5/1995 | Clark | 219/203 |
| 5,423,589 | A | * | 6/1995 | Pank | 296/146.15 |
| 5,697,416 | A | | 12/1997 | Bock et al. | |
| 5,728,632 | A | * | 3/1998 | Sugie | 442/43 |
| 6,598,653 | B1 | | 7/2003 | Gonzalez | |
| 7,059,650 | B1 | | 6/2006 | Wood | |
| 7,093,878 | B1 | | 8/2006 | Fontanilla | |
| 7,156,444 | B1 | | 1/2007 | Da Silva | |
| 7,255,386 | B1 | | 8/2007 | Perniciaro | |

FOREIGN PATENT DOCUMENTS

| | | | | |
|---|---|---|---|---|
| JP | 63145122 | A | * | 6/1988 |
| JP | 05310046 | A | * | 11/1993 |
| JP | 2009274668 | A | * | 11/2009 |
| JP | 3160488 | U | * | 7/2010 |

* cited by examiner

*Primary Examiner* — Glenn Dayoan
*Assistant Examiner* — Paul Chenevert
(74) *Attorney, Agent, or Firm* — Fulwider Patton LLP

(57) ABSTRACT

A pair of vertically disposed handlebars spaced laterally apart mounting a plurality of vertically spaced flexible cords.

6 Claims, 2 Drawing Sheets

WINDSHIELD DEICER

BACKGROUND

1. Field of the Invention

The present invention relates to a deicer for removing ice from an automobile windshield or the like.

2. Description of the Prior Art

The challenges of getting a vehicle underway each morning in a cold climate are well-known. These problems are exacerbated when the automobile is left outside and uncovered.

The windshield and back window of a car generally slope upwardly leaving an upwardly facing exposed surface to, when the automobile is under way, enhance the aerodynamics of air and wind passing thereby and, in the case of the front windshield, to influence the passage of snow, rain and moisture upwardly and rearwardly thereover.

In the cold climates these upwardly exposed surfaces contribute to the early winter morning challenges. That is, upon arriving home in the evening, the automobile is frequently parked in the driveway or along the curb with the passengers exiting to leave the warm vehicle exposed to the elements. In the case of cold rain, sleet or snow coming to rest on the exposed surfaces, as the temperature drops below freezing, the moisture will tend to freeze and as the evening and night wears on, may freeze in multiple layers thus presenting the driver with an extremely uninviting situation in the morning.

Traditionally, these layers of ice have been attacked in the early morning hours by ice scrapers which may be in the form of a plastic blade or the like to leave the driver chipping away at small areas of the windshield, often unable to successfully penetrate the layers of hardened ice and creating a risk that, when penetration is made, scaring of the windshield surface may result.

In recognition of these problems, numerous different types of windshield screens and the like have been proposed to be anchored in covering relation over the windshield. A device of this type is shown in U.S. Pat. No. 2,223,145 to Wise. These devices suffer the shortcoming that they are relatively bulky, cumbersome to install, and themselves frequently become ladened with ice and snow thereby adding to the weight thereof and posing a challenge to the driver seeking to remove the ice ladened shield and separate the snow and ice therefrom for storage.

In recognition of the difficulties of anchoring sheeting to the vehicle or vehicle door handles or the like, it has been proposed to provide an adhesive layer for covering the windshield for adhering a reinforced backing sheet in place. A device of this type is shown in U.S. Pat. No. 3,964,780 to Naidu. Such devices are relatively expensive to manufacture and, being disposable, must be replaced each time they are used. Furthermore, the adhesive layer will tend to stick to the windshield thus impairing vision of the driver.

SUMMARY OF THE INVENTION

The deicer of the present invention includes a plurality of horizontal, vertically spaced apart cutting cords anchored on their respective opposite ends to vertical handles.

DETAILED DESCRIPTION OF THE PREFERRED EMBODIMENTS

Figure 1:
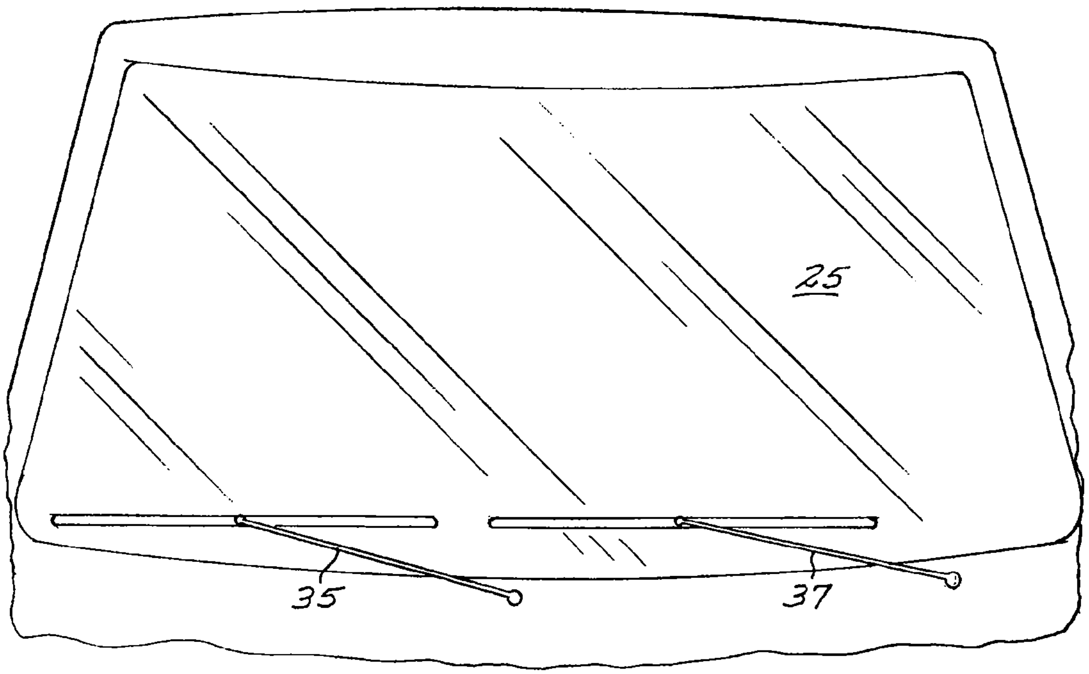
FIG. 1 is perspective front view of a vehicle windshield which may be covered by the deicer of the present invention.
Figure 2:
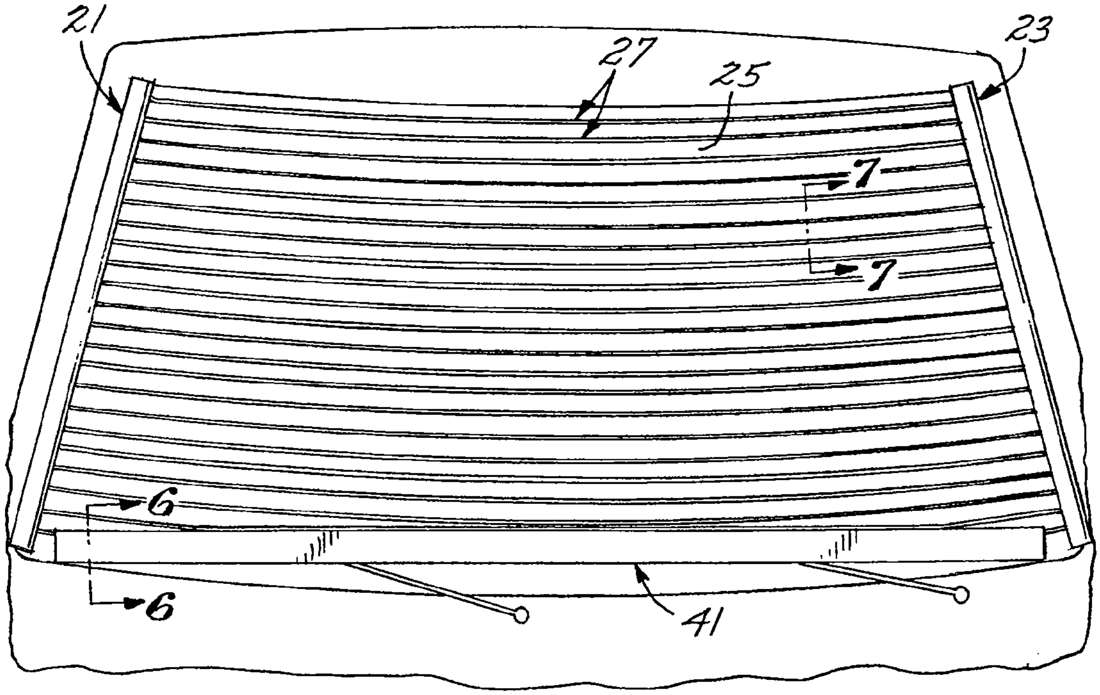
FIG. 2 is a perspective view similar to FIG. 1 but depicting the deicer of the present invention placed over the windshield.
Figure 3:
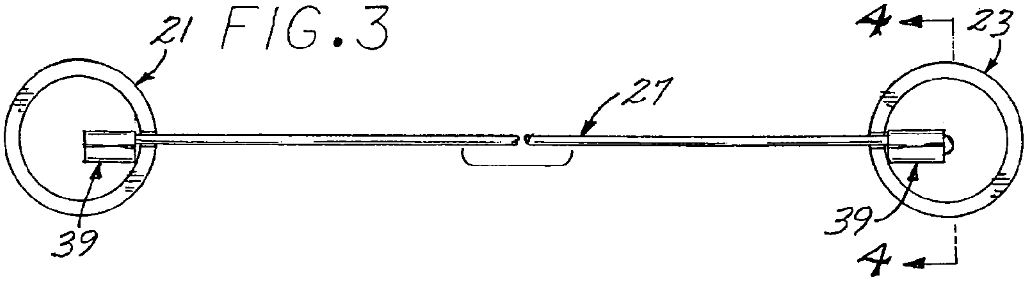
FIG. 3 is a broken top view, in enlarged scale, of the windshield deicer shown in FIG. 2.
Figure 4:
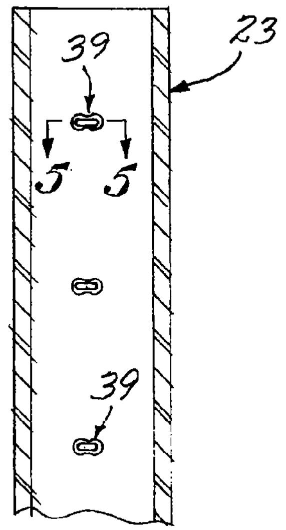
FIG. 4 is a transverse sectional view, in enlarged scale, taken along the line 4-4 of FIG. 3.
Figure 5:
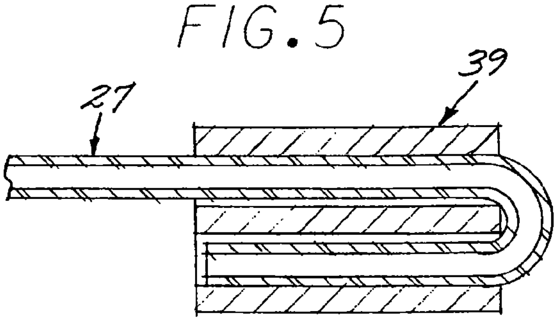
FIG. 5 is a transverse sectional view, in enlarged scale, taken along the line 5-5 of FIG. 4.
Figure 6:
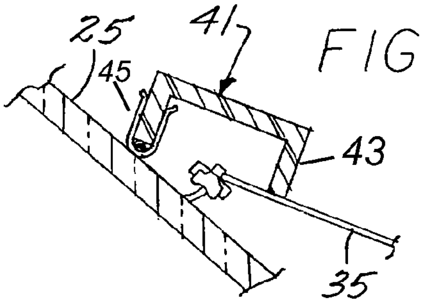
FIG. 6 is a partial vertical sectional view, in enlarged scale, taken along the line 6-6 of FIG. 2.

Referring to FIGS. 2 and 3, the windshield deicer of the present invention includes, generally, a pair of relatively rigid handlebars 21 and 23 to be spaced laterally apart to opposite sides of the windshield 25 and stretched between the handlebars 21 and 23 are a plurality of vertically spaced part cutting cords, depicted as multistrand cables 27 configured to be stretched tight across the horizontal extent of the windshield to maintain their vertical spacing on the windshield. Then, in the event of an ice storm or other icing, resulting in a layer of ice 31 overlying the windshield the cords will be embedded under the ice in vertical spacing. The driver may thus merely grasp one or the other or both of the handlebars 21 and/or 23 to draw the handlebar and the proximate ends of the respective cutting cords 27 away from the windshield thus cutting through the ice sheet to break up the ice and ready the automobile for driving.

Ice collected on the windshield, particularly in a cold subzero night, can be cement hard in the morning thus presenting a major challenge for removal without damage to the windshield. At just 0 degrees C. such ice will have a hardness of 1.5 on the Mosh scale and a density of 0.8 g/cm3. It is this problem to which the present invention is directed.

As used in this patent, the term cutting chord is intended to encompass strands, single and multi strand wire, cable, twisted cable, braided cable or any other flexible strand which might conveniently flex and follow the contour of the windshield and, when the handlebar 21 or 23 is drawn away from the windshield, flex to cut progressively through the sheet of ice.

The term handlebar is intended to encompass any hand grasp element which may be in the form of a tube, rod, channel or the like and may be rigid or semi-rigid with limited flexibility and may be constructed of many different types of olefins such as polyethylene or polypropylene or even wood or any other material well-known to those skilled in the art.

In the exemplary embodiment, the deicer of the present invention is configured to fit easily over curved windshield with a trapezoidally shaped periphery and which angles downwardly and outwardly at the opposite edges thereof. Mounted in a conventional fashion below and forward of the windshield is a pair of windshield wipers 35 and 37.

Conveniently, the handlebars are constructed of plastic tubes having a diameter of about three-quarters of an inch and for the purposes of illustration, include bores drilled in the proximate sides thereof for passage of the respective wires 27 to be turned back on themselves and with their extremities captured in respective fittings 39.

The bores for the cords are spaced vertically apart a distance of at least a quarter of an inch, preferably half an inch and no more than two inches and preferably one inch to provide the desired spacing to adequately cover the vertical extent of the windshield and for the function of severing through the layers of ice in relatively close spaced relationship so that the ice itself is broken into relatively small pieces and subject to effective discard by a conventional ice scraper or the like.

The cords 27 are in the form of $\frac{1}{8}^{th}$ inch diameter braided cables coated by a relatively soft vinyl to provide a cushioning effect in contacting the surface of the windshield. This construction provides for a relatively great degree of flexibility so that the wires will follow the curvature of the windshield and, when to be stowed, may be folded or wrapped about one or the other or both of the handlebars and stored in a compact organized package within the trunk of the car or the like.

As will be appreciated by those skilled in the art, the cutting cords may take many different forms and sizes, it only being important that they possess sufficient tensile strength to withstand a force of about 100 pounds, have sufficient body to allow for convenient placement on the windshield while still having sufficient flexibility to bend under stress as drawn perpendicularly away from the surface of the windshield to form a radius of curvature of about 3 centimeters or less to thereby allow for the forces associated with the ice cutting process to be accomplished principally under the tensile force applied to the respective cords.

The preferred embodiment of the present invention includes a windshield wiper cover, generally designated 41, mounted horizontally along the bottom of the deicer. For the purpose of illustration, I show a plastic anchor 43 anchored to the deicer device and having one leg thereof capped by a cushioning clip 45 to provide further cushioning and protection against damage to the surface of the windshield.

In use, it will be appreciated that when the car is parked for the evening, the present invention may be conveniently retrieved from the trunk of the car and deployed across the surface of the windshield with the posts defining the respective handlebars 21 and 23 disposed at the opposite edges of the windshield angling laterally downwardly and outwardly to complement the shape of the windshield and provide for full coverage of a windshield surface. In some instances, for narrower windshields, one or the other or both of the posts may be reeled up on the cutting cords 27 to take up any extra length. In this manner, the cords 27 will be organized in evenly spaced relationship across the surface of the windshield spaced apart about one inch in preparation for the oncoming snow, sleet or rain. The windshield wiper channel 43 will be placed over the respective blades of the windshield wipers 35 and 37 to afford protection against moisture flowing downwardly on the windshield to divert such moisture from gathering above the surface of the respective wiper blades and freezing them to the windshield.

The vinyl coating on the braided cable or wire will serve to protect the windshield against scratching and while retaining the flexibility of the wire itself.

During the driver's absence from the car, it will be appreciated that snow, sleet and/or freezing rain may collect on the deicer over the surface of the windshield 25 and build up layers of ice to a thickness of ⅛" to ⅜" inch or the like. In the hours of extremely cold temperature, these layers of ice will be extremely hard and nearly impenetrable by conventional ice scrapers.

Figure 7:
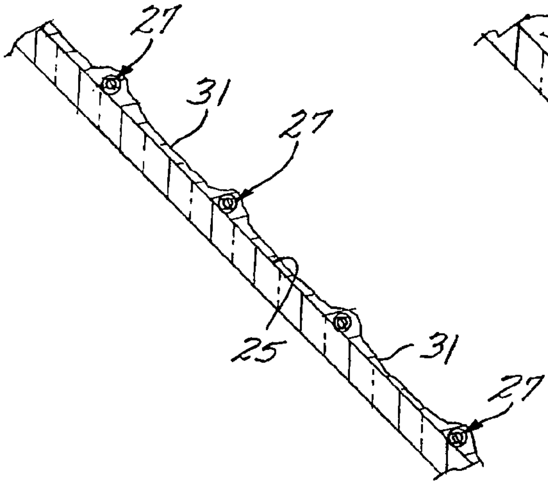
FIG. 7 is a vertical sectional view, in enlarged scale, taken along the line 7-7 of FIG. 2 and depicting a coating of ice over the deicer.
Figure 8:
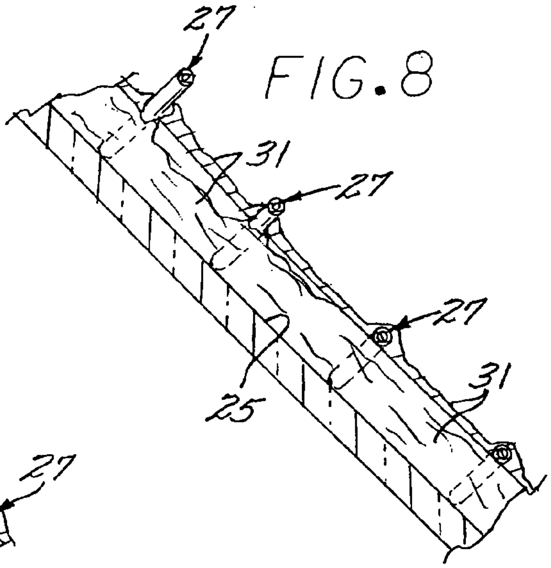
FIG. 8 is a sectional view similar to FIG. 7 but depicting the deicer cutting the ice and lifting the coating away from the windshield.

As will be appreciated, however, when the driver arrives at the vehicle, he or she may easily grasp one or the other of the handlebars 21 or 23 and lift that handlebar up away from the windshield, possibly progressively from the bottom side to thus progressively raise the proximate ends of the cords 27 upwardly off the windshield from the position shown in FIG. 7 toward the position shown in FIG. 8 thereby cutting the cords progressively through the layer of ice. It will be appreciated that a force to progressively sever the ice layer by the individual cords is relatively modest thus contributing to the convenience and effectiveness of operation even by the slightest of drivers.

In many instances, when the ice bonds to the windshield is not great, the ice coat may be peeled away as a composite layer without the necessity of the cutting action of the chord. When the ice bonds to the windshield is such as to resist peeling off, the handlebar, for instance 23, may be raised progressively from the windshield and the entire family of wires 27 caused to progressively cut through the layer of ice thus breaking up the ice and cracking adjacent segments as the wires are drawn from the windshield throughout the entire transverse width of the windshield. That is, as the driver draws, for instance, the upper extremity of one of the handlebars away from the surface of the windshield the proximate extremity of upper most chord will be drawn away from the windshield causing the chord to apply a cutting force to a small area of the ice, acting pretty much along a longitudinal line of the embedded chord, to thus break up the ice blanket along the line defined by the particular chord.

This process will be repeated in a progressive manner by each of the cords thus leaving the ice blanket broken up along the lines defined by the cords to thereby invade the integrity of the ice blanket leaving the discontinuous ice subject to ready and quick removal by a conventional ice scraper. The driver may then easily shake the wires 27 to remove any residual ice or snow and fold or roll the deicer into a neat compact package for return to the trunk.

Then, to finish the project, the driver may conveniently retrieve an ice scraper and scrape the broken and fractured ice layer from the windshield or, in many instances, the simple actuation of the defroster will complete the task when augmented by the action of the windshield wipers themselves.

In some embodiments of the present invention, the cords may be sufficiently long to permit the handle bars to be positioned inside the car and car doors closed on the opposite extremities of the cords to trap such extremities between the edges of the respective doors and the edges of the respective door ways and in any weather stripping seals that may be incorporated to thereby capture the cords in place and lock device against any unwanted taking by unauthorized persons.

For the foregoing it will be appreciated that the deicer of the present invention is relatively economical to manufacture, convenient to store and use and is highly effective to break up the layer of ice on a windshield.

I claim:

1. A deicer comprising a pair of elongated rigid handlebars configured and arranged to spaced apart disposed adjacent the opposite sides of the windshield and configured to extend vertically along the opposite sides of the windshield substantially the full height of the windshield;

a plurality of flexible deicing cutting cords constructed to, when the handle bars are spaced the predetermined distance apart on the windshield, project horizontally thereacross and being anchored at their opposite ends to the respective handle bars, the cords having a diameter of substantially ⅛ inch, being spaced vertically apart a distance between ¼ inch and 1 inch, free from one another throughout their horizontal lengths whereby the handle bars may be placed on the windshield spaced apart the predetermined distance on the opposite sides of the windshield to draw the cords relatively tightly to be disposed linearly across the windshield and, in the event of a coat of ice being formed over the windshield, one or the other of the handle bars may be grasped at one end to draw the one end away from the windshield and progressively raise the one end from the windshield to cut through the blanket of ice and progressively cut the individual cords through the blanket of ice thereby breaking up the blanket of ice and leaving the ice susceptible to ready scraping by an ice scraper or the like.

2. The deicer device of claim 1 wherein:

the cords are constructed of multiple stands.

3. The deicer as set forth in claim 1 that includes:

a windshield wiper protector mounted to the lower portion thereof for, when the deicer is on the windshield, being disposed in covering relationship over a windshield wiper disposed in a retracted position on the windshield.

4. The deicer device of claim 1 wherein:

the handle bars are constructed of elongated, rigid members, clipped on the lateral sides, except for communication with the cords.

5. The windshield deicer of claim 1 wherein:

the cords are coated with a cushioning coat.

6. The deicer of claim 5 wherein:

the cushioning coat is plastic.

* * * * *